Patented Aug. 26, 1947

2,426,576

UNITED STATES PATENT OFFICE 2,426,576

CHLORINATED-ALIPHATIC ETHER OF AMINO-DIPHENYLAMINES

John P. Goulding, Neshanic Station, Robert P. Parker, Somerville, and John J. Denton, Bound Brook, N. J., assignors to American Cyanamid Company, New York, N. Y., a corporation of Maine No Drawing. Application July 3, 1944, Serial No. 543,432

8 Claims. (Cl. 260—571)

This invention relates to halogen substituted 4'-alkoxy-4-nitro or 4-amino diphenylamines and more particularly to chlorine containing compounds in which the alkoxy group does not have more than four carbon atoms.

The compounds of the present invention may be represented by the following formula:

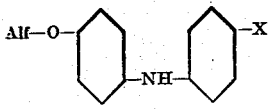

in which Alf is a halogen containing aliphatic hydrocarbon radical having not more than four carbon atoms. X is nitro or amino or a salt of the latter with a strong acid.

The compounds of the present invention and particularly the amino compounds which are preferred are useful in the production of azo dyestuffs. When diazotized and coupled, particularly with ice-color coupling components azo dyestuffs are obtained which exhibit superior fastness properties such as fastness to light, heat and washing and the colors retain their brightness well.

While the compounds of the present invention are not intended to be limited to any particular method of production, the preferred method is to produce the nitro compounds by reacting 4'-hydroxy-4-nitro diphenylamine or its 2-sulfonic acid derivative with an ester of the halogen containing alkoxy compound such as an aliphatic halide containing additional less reactive halogen atoms or halogen containing aliphatic esters of organic or inorganic acids. The reactions are generally carried out in the presence of acid binding agents.

A second method of producing the compounds of the present invention is to prepare a hydroxy-alkoxy nitro diphenylamine and react the hydroxy group with an hydrogen halide or an acid halide.

A third method is to introduce chlorine, bromine or hydrogen halide into an unsaturated 4'-aliphatic-4-amino or 4-nitro diphenylamine.

When the nitro compound is first produced the nitro group may be reduced to an amino group by reduction in the usual manner. The amines may be isolated from reduction as the free base or as their salts. For use in preparing azo dyestuffs, it is immaterial whether the compound is in the form of the free base or its salts.

Typical halogen containing alkoxy radicals present in the 4' position in 4-amino or 4-nitro diphenylamines are the following: chlormethyl, beta - chloroethyl, gamma - chlorpropyl, beta-chlorpropyl, alpha - methyl - beta - chloroethyl, beta-gamma-dichlorpropyl, beta-methyl-gamma-chlorpropyl, delta - chlorbutyl, beta - chlorallyl, delta chlorcrotyl, beta-bromo-ethyl, beta-fluoro-ethyl, beta-iodo-ethyl and gamma fluoropropyl.

The invention will be described in conjunction with the following examples which are typical. All parts are by weight unless otherwise noted.

Example 1

Potassium 4'-(beta-chloroethoxy)-4-nitrodiphenylamine-2-sulfonate

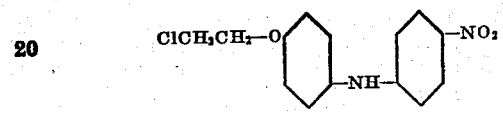

In a reaction vessel fitted with stirrer and reflux condenser is placed 104.4 parts potassium 4' - hydroxy-4-nitro diphenylamine-2-sulfonate. To this is added a solution of 18 parts potassium hydroxide in 200 parts of water, and then 70.4 parts beta-chloroethyl-p-toluene sulfonate. The reaction mixture is heated under reflux; at first it is very dark in color but gradually changes to a deep, clear red. When the solution is cooled, potassium 4' - (beta - chloroethoxy) - 4 - nitrodiphenylamine-2-sulfonate crystallizes as yellow solid in a thick slurry. The solid is collected on a filter, washed free of potassium chloride by use of iced water and dried. It is obtained chemically pure by recrystallization from dilute ethanol.

Example 2

4'-(beta-chloroethoxy)-4-aminodiphenylamine-2-sulfonic acid

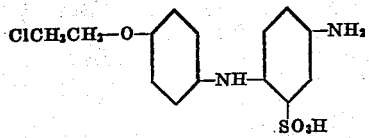

164.2 parts of the product of Example 1 is dissolved in 1200 parts of water and 37.8 parts glacial acetic and the mixture is heated to 50° C. 112 parts of iron powder is gradually added. After all of the iron has been added, the reaction mixture is heated up to 75–80° C. and after an hour six more parts of iron powder are added. The reaction is continued until reduction is complete which is indicated by disappearance of color. The solution is made alkaline to phenolphthalein with soda ash, charcoal is added and the solution filtered. The filtrate is chilled in an ice bath and made strongly acidic to Congo red paper by dropwise addition of concentrated hydrochloric acid. The gray solid which forms is collected on a filter and dried. Chemically pure 4'-(beta-chloroethoxy)-4-aminodiphenylamine-2-sulfonic acid is obtained by dissolving this material in dilute soda ash solution, clarifying, filtering, and reprecipitating the amino sulfonic acid by addition of hydrochloric acid.

*Example 3*

4'-(beta-chloroethoxy)-4-aminodiphenylamine hydrochloride

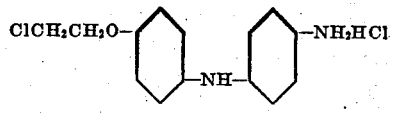

34.3 parts of the production of Example 2 are ground to a slurry with concentrated hydrochloric acid and the slurry is then stirred while additional hydrochloric acid is added, to bring the total volume to 475 parts. The reaction mixture is then heated under a reflux and additional 238 parts of concentrated hydrochloric acid being added in 3 portions during the first 4 hours of refluxing. The refluxing is continued for several hours after the hydrochloric acid addition until the suspended solid is completely dissolved and the solution is clear. The solution is then concentrated at reduced pressure to one-third its original volume, the concentrated solution is chilled and a mixture of salts of the amine precipitates. Pure 4'-(beta-chloroethoxy)-4-aminodiphenylamine hydrochloride is obtained from the mixed salt by dissolving it in water, precipitating the sulfate present with barium or calcium chloride and then isolating the amine hydrochloride from the solution.

*Example 4*

20 parts of the product of Example 3 is dissolved in 60 parts of 17% hydrochloric acid and 300 parts of water by warming. The solution is cooled to 25° C. and is diluted with an additional 240 parts of water. The amine is diazotized at 25° C. by the slow addition of a solution of 8 parts sodium nitrite in 50 parts of water. After diazotization is complete, the solution is heated at 35° C., is treated with decolorizing charcoal and filtered. The filtrate is chilled in an ice-salt bath and 100 parts of concentrated sulfuric acid is added dropwise. The diazonium acid sulfate is salted from the solution by addition of sodium sulfate. The precipitated solid is collected on a filter, washed with cold dilute sodium sulfate solution, and dried in a desiccator.

*Example 5*

A dry mixture is prepared by blending 15 parts of the diazonium acid sulfate as obtained from Example 4 with 9.8 parts of magnesium sulfate dihydrate, and 3 parts of anhydrous sodium sulfate.

2 parts of this mixture are dissolved in 25 parts of water and the solution is treated with 73 parts of a suitable carbohydrate thickener. The resulting paste is printed on cotton piece goods, previously impregnated in alkaline solution with the anilide of 2-hydroxy-3-naphthoic acid, from an engraved copper roll. The resulting print is dried at elevated temperature and the goods are cleared by treatment in dilute soda ash solution at 70° C. After soaping at 65° C., the goods are dried. The pattern is evenly printed a strong blue of superior fastness properties.

When, instead of the anilide of 2-hydroxy-3-naphthoic acid, other coupling components are substituted in the alkaline grounding liquor used to prepare the cotton piece goods, the following colors are obtained:

| | Coupling Component | Color |
|---|---|---|
| 1 | o-Toluidide of 2-hydroxy carbazole-3-carboxylic acid. | Heavy purple. |
| 2 | o-Toluidide of 2-hydroxy anthracene-3-carboxylic acid. | Deep green. |
| 3 | Bis-(acetoacetic)-o-tolidide. | Reddish yellow. |

*Example 6*

4.0 parts of 4'-(beta-chloroethoxy)-4-aminodiphenylamine obtained by neutralizing the hydrochloride from Example 3 are dissolved in 20 parts of ethanol by heating and this is poured onto a stirred solution of 60 parts of fused zinc chloride in 60 parts of water. Then 1.5 parts of sodium nitrite are added, and the solution is stirred for ¼ hour. The resulting solution is filtered, the residue being washed with 125 parts of warm water and the combined filtrates are treated with 20 parts sodium chloride. The zinc chloride double salt of 4'-(beta-chloroethoxy) diphenylamine-4-diazonium chloride which separates is filtered off and is dried at low temperature.

*Example 7*

4.3 parts of the zinc chloride double salt of the diazonium chloride as obtained in the previous example are intimately mixed with 1.4 parts of partially dehydrated magnesium sulfate.

2.0 parts of this dry mixture are dissolved in 27 parts of water; 1.0 part of 50% acetic acid and 70 parts of suitable carbohydrate thickener are added.

Cotton piece goods are prepared in a grounding liquor comprising 5.0 parts of the beta-naphthylamide of 2-hydroxy-3-naphthoic acid, 5.0 parts of methanol, 20.0 parts of 20% sodium hydroxide and 470.0 parts of water, squeezed out and dried.

The above printing paste is printed on this prepared cloth from an engraved roll, the print is skyed and is dried at 60° C. The goods are cleared in a dilute soda ash solution at the boil, are then soaped at elevated temperature and are dried. The pattern is evenly dyed a strong deep blue.

When, instead of the beta-naphthylamide of 2-hydroxy-3-naphthoic acid, the orthophenetidide is employed, a blue or greener shade is produced.

*Example 8*

0.4 part of the diazonium acid sulfate obtained as described in Example 4 is stirred in 2.5 parts of methanol and is treated with a slurry of 1.5 parts of the anilide of 2-hydroxy-3-naphthoic acid in 2.5 parts of methanol and 4.5 parts of pyridine. The mixture changed to a deep blue-black immediately and a thick paste resulted. This is stirred while heated on a steam bath for 10 minutes and is then diluted with 300 parts of water and the solution is made alkaline with 10.0 parts of 20% sodium hydroxide. The precipitated pigment is flocculated by digestion on a steam bath, is filtered off, is washed with hot water and is dried at 55° C.

A deep blue-black powder results insoluble in water; the dyestuff having the following formula:

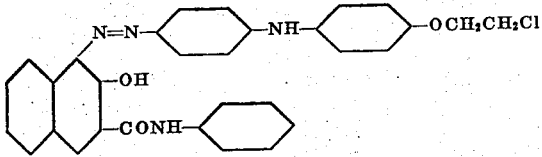

When an equivalent quantity of beta-naphthol is substituted in the coupling as above, a dark blue pigment is obtained having the following formula:

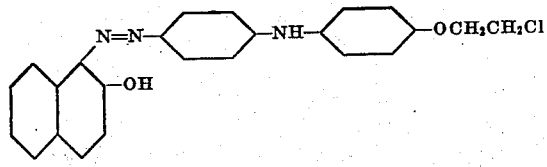

Example 9

4'-(gamma-chlorpropoxy)-4-nitrodiphenylamine

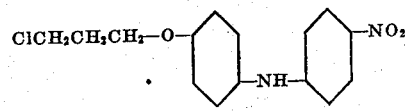

23 parts of 4'-hydroxy-4-nitrodiphenylamine, 50 parts of water, and 4.4 parts of sodium hydroxide are placed in the reaction vessel and heated slowly to reflux while 27.4 parts of gamma-chloropropyl para-toluene sulfonate are added dropwise. The reaction mixture is refluxed for 4½ hours. After cooling the mixture, the product separates out as a solid. The product is filtered by suction, washed with dilute caustic and then finally with water and dried at a low temperature. After recrystallization from dilute methanol, the product 4'-(gamma-chlorpropoxy)-4-nitrodiphenylamine has a melting point of 102–104° C.

Example 10

4'-(gamma-chlorpropoxy)-4-aminodiphenylamine hydrochloride

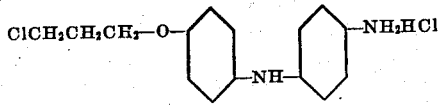

20 parts of the production of the Example 9 is slurred with 238 parts of hydrochloric acid and warmed to 40° C. while 44.5 parts of 20 mesh metal tin is added slowly in portions with stirring. After all of the tin has been added the mixture is heated to 70° C. and maintained at this temperature until the white tin double salt separates out which takes several hours for completion. After cooling to 50° C. the tin double salt is filtered off on a suction filter and recrystallized from dilute hydrochloric acid. The solution of this tin double salt dissolved in 300 parts of water is neutralized with soda ash to an alkaline spot test to Brilliant Yellow paper. The precipitated amine is extracted from this aqueous mixture with ether. After drying the ether extract with sodium sulfate, 4'-(gamma-chlorpropoxy) - 4 - aminodiphenylamine hydrochloride is precipitated out of the ether solution by the addition of dry hydrogen chloride. The hydrochloride melts at 190–191.5° C. with decomposition.

Example 11

6.3 parts of the hydrochloride of 4'-(gamma-chlorpropoxy)-4-aminodiphenylamine as obtained in Example 10 are dissolved in a mixture of 24 parts of 17% hydrochloric acid and 70 parts of water, and the resulting solution is quickly iced to 15° C. A solution of 1.7 parts of sodium nitrite in 23 parts of water is slowly added to this mixture, and the whole is stirred until diazotization is complete. The diazo solution is clarified by filtration at 40° with diatomaceous earth. The filtrate is cooled and is treated with sodium chloride. The diazonium chloride of 4'-(gamma-chlorpropoxy)-4-aminodiphenylamine separates as a low melting solid which solidifies on drying. It is readily soluble in water.

Example 12

A blend of the diazonium chloride as obtained from Example 10 is prepared by intimately mixing 2.25 parts with 1.8 parts of a mixture of magnesium sulfate-sodium sulfate (two parts of magnesium sulfate dihydrate to one part of sodium sulfate).

Cotton fabric previously impregnated with the anilide of 2-hydroxy-3-naphthoic acid when treated in a water solution of a part of this mixture, then heated in dilute soda ash and finally in ½% soap solution is dyed a bright blue of good fastness properties.

Example 13

A printing paste is prepared by dissolving 2 parts of the blended diazonium chloride as prepared in Example 12 in 28 parts of water and adding 75 parts of a suitable starch thickener. This print paste is printed from an engraved roll on cotton piece goods which have been previously impregnated in an alkaline grounding liquor of the anilide of 2-hydroxy-3-naphthoic acid. The print is dried at elevated temperature and is then cleared by heating at 70° C. in a dilute soda ash solution. The print is then soaped at the boil, rinsed and dried. The pattern is printed a heavy blue of superior fastness properties.

Example 14

4'-(2''-chloroallyloxy)-4-nitrodiphenylamine

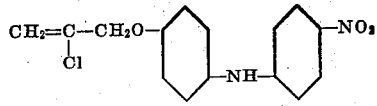

A solution of 34.5 parts of 4'-hydroxy-4-nitrodiphenylamine and 6.4 parts of sodium hydroxide in 240 parts of 95% ethanol are mixed with 17.5 parts of 2-chloroallyl chloride and the mixture is heated under gentle reflux for a number of hours until completion. The solution is poured onto 700 parts of water and a golden yellow solid separates out. This solid is collected on a filter and dried. The product 4'-(2''-chloroallyloxy)-4-nitrodiphenylamine crystallized from methyl alcohol melts at 82–84° C. This product shows the phenomenon of existing in two forms, namely, a yellow form and a red form.

Example 15

4'-(2''-chloroallyloxy)-4-aminodiphenylamine hydrochloride

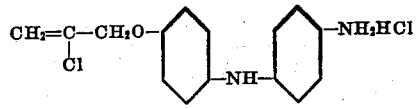

22.2 parts of iron powder are dispersed in 240 parts of water containing one part of glacial acetic acid and a small amount of sodium salt of a higher alkyl sulfuric acid as a wetting agent. The temperature of the mixture is then raised to 75° C. and 12.2 parts of the product of Example 14 are added. The mixture is warmed in a water bath at 99° C. until reaction is complete. The mixture is then cooled, filtered and the iron sludge is extracted with 150 parts of acetone. The acetone solution is clarified by filtration with charcoal. The clear acetone solution is cooled and then water is added until the free base precipitates out as an oil. This is extracted with ether, and the dihydrochloride of 4'-(2''-chloroallyloxy)-4-aminodiphenylamine is precipitated from this ether solution by the addition of dry hydrogen chloride. When purified by crystallization from dilute hydrochloric acid, the monohydrochloride salt is produced which melts at 190–191.5° C.

Example 16

3.5 parts of 4'-(2''-chlorallyloxy)-4-aminodiphenylamine hydrochloride are dissolved in a solution of 12 parts of 17% hydrochloric acid in 35 parts of water, and the resulting solution is quickly iced to 15° C. A solution of 0.83 part of sodium nitrite in 12 parts of water is added slowly to this solution, and the whole is stirred until the diazotization is complete. The solution is clarified by filtration at 40° C. with diatomaceous earth. The filtrate is cooled and sodium chloride is added. The diazonium chloride of 4'-(2''-chloroallyloxy)-4-aminodiphenylamine precipitates as an oily solid which after separation and drying becomes friable. It may be rapidly dried and solidified by intimately mixing it with an equivalent weight of a mixture of magnesium sulfate-sodium sulfate (two parts magnesium sulfate dihydrate to one part anhydrous sodium sulfate). The resulting blended product is readily soluble in water.

Example 17

One part of the blended diazonium chloride as prepared in Example 16 is dissolved in 300 parts of water and then 5.0 parts of cotton piece goods previously impregnated in an alkaline grounding bath of the ortho-phenetidide of 2-hydroxy-3-naphthoic acid are entered to the dye bath and are well stirred for 10 minutes. The goods are removed, rinsed in fresh water, cleared in boiling dilute soda ash bath, treated in ½% soap solution at 65° C., rinsed in fresh water and dried.

The cloth is evenly dyed a heavy shade of blue.

When instead of the ortho-phenetidide of 2-hydroxy-3-naphthoic acid the anilide is employed in the above dyeing operation, the cloth is dyed a strong blue of redder shade.

Example 18

A printing paste is prepared by dissolving 2 parts of the blended diazonium chloride as obtained in Example 16 in 28 parts of water and adding 70 parts of suitable carbohydrate thickener. This print paste is printed from an engraved roll on cotton piece goods previously impregnated in an alkaline grounding liquor of the anilide of 2-hydroxy-3-naphthoic acid and the print is finished by the procedure of Example 5. The fabric is printed a strong blue of superior fastness properties.

We claim:

1. A chemical compound having the formula

Alk—O—⟨ ⟩—NH—⟨ ⟩—NH₂ in which Alk is halogenated alkyl radical having not more than 4 carbon atoms.

2. A compound according to claim 1 in which the halogen is chlorine.

3. A compound according to claim 1 in which the alkyl radical is mono-chlor substituted.

4. A salt of the compound of claim 1.

5. A salt of the compound of claim 1 in which the halogen is chlorine.

6. A salt of the compound of claim 1 in which the alkyl radical is mono-chlor substituted.

7. The new chemical compound 4'-beta-chloroethoxy)-4-aminodiphenylamine.

8. The new chemical compound 4'-(gamma-chlorpropoxy)-4-aminodiphenylamine.

JOHN P. GOULDING.
ROBERT P. PARKER.
JOHN J. DENTON.

REFERENCES CITED

The following references are of record in the file of this patent:

UNITED STATES PATENTS

| Number | Name | Date |
|---|---|---|
| 2,189,411 | Yohe | Feb. 6, 1940 |
| 2,278,559 | Paul | Apr. 7, 1942 |
| 2,342,136 | Gibbs | Feb. 22, 1944 |